US005506458A

United States Patent [19]

Pace et al.

[11] Patent Number: 5,506,458
[45] Date of Patent: Apr. 9, 1996

[54] LOW COST PERMANENT MAGNET DISK SPINDLE MOTOR

[75] Inventors: Louis G. Pace, Santa Clara; Thomas A. Tacklind, San Martin, both of Calif.

[73] Assignee: Quantum Corporation, Milpitas, Calif.

[21] Appl. No.: 206,596

[22] Filed: Mar. 4, 1994

[51] Int. Cl.⁶ .............................. H02K 7/14; H02K 1/12; H02K 17/08
[52] U.S. Cl. ..................... 310/67 R; 310/254; 360/98.07
[58] Field of Search ................................ 310/49 R, 67 R, 310/162, 164, 254; 360/98.07, 99.04, 99.08

[56] References Cited

U.S. PATENT DOCUMENTS

| Re. 28,075 | 7/1974 | Kavanaugh | 310/49 |
|---|---|---|---|
| 3,238,399 | 3/1966 | Croymans et al. | 310/46 |
| 3,806,744 | 4/1974 | Abraham et al. | 310/49 R |
| 4,656,381 | 4/1987 | Komatsu | 310/164 |
| 4,858,044 | 8/1989 | Crapo | 360/99.08 |
| 4,899,075 | 2/1990 | Hasebe | 310/68 B |
| 4,987,331 | 1/1991 | Horng | 310/254 |
| 5,093,599 | 3/1992 | Horng | 310/254 |

*Primary Examiner*—Clayton E. LaBalle
*Attorney, Agent, or Firm*—David B. Harrison

[57] ABSTRACT

A low cost, polyphase spindle motor for a hard disk drive comprises a base, a cup-shaped rotating hub for mounting at least one rotating data storage disk, a bearing assembly mounted between the base and the hub enabling rotation of the hub relative to the base, and a cylindrical permanent magnet mounted to an inside cylindrical wall of the hub and defining a plurality of circumferentially alternating magnetic poles. A single ferromagnetic sleeve is mounted to the base and forms one element of the bearing assembly. The sleeve defines a plurality of generally U-shaped stator armature assemblies fixed with respect to the base, each stator armature assembly comprising a top stator disk of ferromagnetic material, a bottom stator disk of ferromagnetic material and a cylindrical portion of the ferromagnetic sleeve magnetically coupling the top disk portion and the bottom disk portion, the stator armature further including a coil between the top stator disk and the bottom stator disk, each stator disk defining a plurality of circumferentially spaced apart stator pole ends being in number related to the number of poles of the permanent magnet, the pole ends of the bottom stator disk being angularly displaced from the pole ends of the top stator disk by a predetermined first electrical angle, the pole ends of the stator disks of each of the plurality of armature assemblies being electrically angularly displaced from the pole ends of at least one of the stator disks of the other of the plurality of armature assemblies by a predetermined second electrical angle.

27 Claims, 7 Drawing Sheets

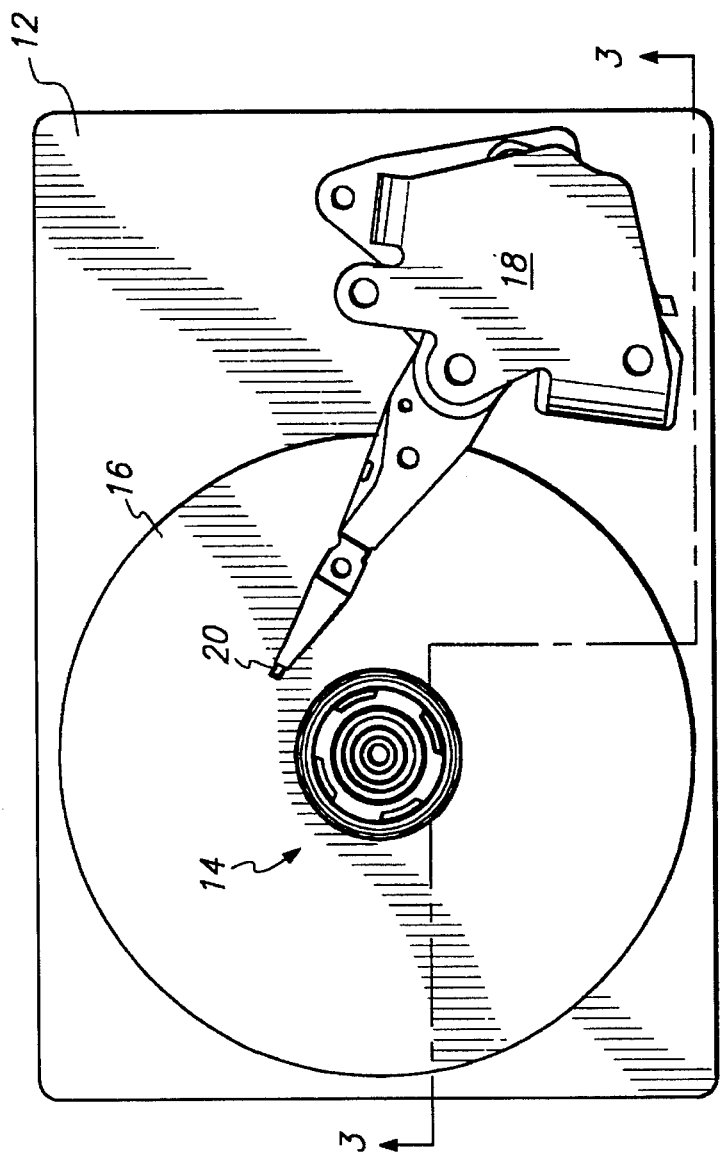
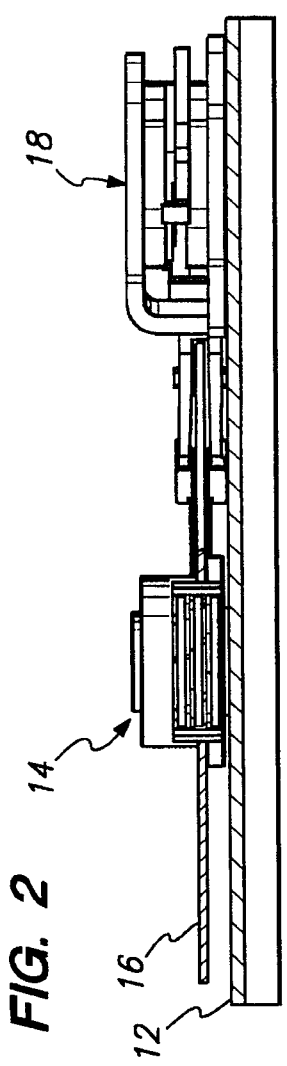
FIG. 2
FIG. 3

LOW COST PERMANENT MAGNET DISK SPINDLE MOTOR

FIELD OF THE INVENTION

The present invention relates to electrical motors. More particularly, the present invention relates to a low cost permanent magnet direct current spindle motor for a hard disk drive.

BACKGROUND OF THE INVENTION

Data storage on rotating disks dates back to the development of the first disk phonograph. Elemental to disk data storage is a mechanism for rotating the disk at a desired angular velocity.

Spindle motors have been included within disk spindle hub and bearing assemblies. This common arrangement has the advantage that the motor and the disk spindle share a common spindle shaft and bearing assembly. Also, there is no likelihood of belt slippage since there is no drive belt between the spindle and the motor.

Conventional spindle motors for hard disk drives have typically included a rotating annular permanent magnet structure in surrounding proximity to a fixed, multiple pole stator structure comprising pole pieces facing the rotating permanent magnet. The stator pole pieces have been formed of laminations of soft magnetic core material. Coils of wire have been formed around narrow gap spoke segments of the stator core. Typically, six or nine coils and poles have been provided in three-phase brushless DC spindle motors, and they have conventionally confronted 4, 6, 8, 9, or 12 pole permanent magnet rotors. The nine-pole stator structure —eight pole rotor magnet arrangement has been particularly popular in fixed disk drives because the uneven number of stator and rotor poles has been said to reduce generation of uneven torque force in the spindle, commonly referred to as "cogging torque". One example of this conventional arrangement of stator and rotor poles in a hard disk drive spindle motor is given in U.S. Pat. No. 4,858,044. One drawback of these conventional disk drive spindle motors is that they are complicated and expensive to assemble during disk drive manufacturing. Another disadvantage of "low cogging torque" disk spindle motors of the type employing 8 pole-9 slot arrangements is that uneven torque force results, leading to vibration and noise.

Tin-can or "canstack" motors have commonly been employed as stepper motors. These low cost motors are typically formed of two stacked annular stator coil bobbins surrounded by a "can" of soft magnetic material which forms a series of circumferentially alternating magnetic pole tabs along an inner opening. The polarity of a particular tab is governed by direction of current flow through its associated bobbin coil. A rotor includes a shaft and a permanent magnet structure. The permanent magnet structure defines a series of circumferentially spaced apart poles. A skew exists between the pole tabs of the stators and the permanent magnet poles, such that a North pole of a pole tab will directly align with a South pole of the permanent magnet at one detent position. However, at this position, the other tabs and poles are misaligned. By progressively alternating the direction of current flow in the two bobbin coils, unidirectional rotation in steps of the rotor shaft is realized.

As explained, the rotor shaft is journalled to the "can" and is rotated as direct current driving pulses are passed through the bobbin coils. Driving currents applied to the bobbin coils cause a step-by-step rotation of the rotor along stable detents, and thus render these motors suitable for incremental positioning, such as rotation of a printer platen or print head, or head actuator positioning in a floppy disk drive. Examples of conventional canstack DC motors including bobbin wound coils are given in U.S. Pat. No. Re 28,075, and in U.S. Pat. No. 3,238,399, for example. Bobbin coil permanent magnet motors have also been employed as synchronous motors within small cooling fans used to draw cooling air currents through or across heat-generating components of electronic and computing equipment, such as switching power supplies, for example.

While these technologies have been proven to be useful in several applications, a hitherto unsolved need has remained for a significantly cost-reduced motor for a disk spindle of a low cost hard disk drive.

SUMMARY OF THE INVENTION WITH OBJECTS

A general object of the present invention is to provide an improved and cost-reduced motor for rotating a data storage disk in a disk drive data storage device.

Another general object of the present invention is to provide a low cost disk drive spindle motor which is adapted for assembly as a single process without requiring a series of assembly processes or stages.

A further, more specific object of the present invention is to modify, and adapt "canstack stepper motor" technology to provide a low cost, low torque ripple direct drive spindle motor for a hard disk drive.

One more specific object of the present invention is to provide a low cost stacked-bobbin spindle motor for a disk drive in which torque ripple has been minimized.

Yet another specific object of the present invention is to provide a low cost stacked-coil, plural phase spindle motor and base assembly for a hard disk drive.

In accordance with principles of the present invention, a low cost, polyphase spindle motor for a hard disk drive comprises a base, a cup-shaped rotating hub for mounting at least one rotating data storage disk, a bearing assembly mounted between the base and the hub enabling rotation of the hub relative to the base, and a cylindrical permanent magnet mounted to an inside cylindrical wall of the hub and defining a plurality of circumferentially alternating magnetic poles. In one embodiment a single ferromagnetic sleeve is mounted to the base and forms one element of the bearing assembly. The sleeve defines a plurality of stacked, generally U-shaped stator armature assemblies fixed with respect to the base, each stator armature assembly comprising a top stator disk of ferromagnetic material, a bottom stator disk of ferromagnetic material and a cylindrical portion of the ferromagnetic sleeve magnetically coupling the top disk portion and the bottom disk portion, the stator armature further including a coil between the top stator disk and the bottom stator disk, each stator disk defining a plurality of circumferentially spaced apart stator pole ends being in number related to the number of poles of the permanent magnet, the pole ends of the bottom stator disk being angularly displaced from the pole ends of the top stator disk by a predetermined first electrical angle, the pole ends of the stator disks of each of the plurality of armature assemblies being electrically angularly displaced from the pole ends of at least one of the stator disks of the other of the plurality of armature assemblies by a predetermined second electrical angle.

In an alternative embodiment, a unitary plural coil stator assembly is formed by injection molding of a ferromagnetic material. The single stator assembly defines a plurality of motor phases relative to the rotating polyphase permanent magnet.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

In the Drawings:

FIG. 2 is a top plan view of the FIG. 1 head and disk assembly.

FIG. 3 is a view in elevation and section of the FIG. 1 head and disk assembly taken generally along the line 3-3 in FIG. 2.

DETAILED DESCRIPTION OF A PREFERRED EMBODIMENT

Figure 1:
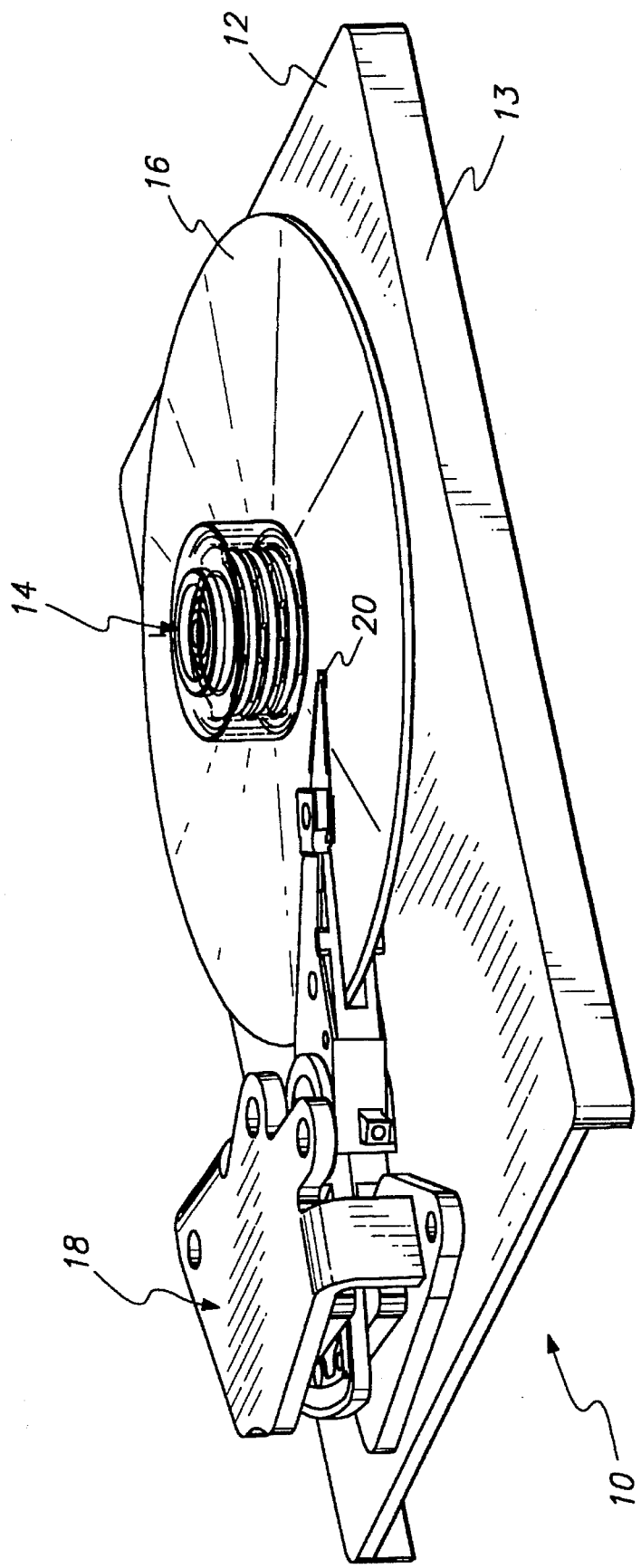
FIG. 1 is a somewhat diagrammatic isometric view of a hard disk drive head and disk assembly incorporating an in-hub spindle motor in accordance with principles and aspects of the present invention.

With reference to FIG. 1, one presently preferred embodiment of a disk drive head and disk assembly 10 including a low cost spindle motor in accordance with principles of the present invention is shown. The head and disk assembly 10 includes a base 12 preferably formed as a stamping from steel alloy sheet metal. Alternatively, the base may be an aluminum alloy plate and have stamped steel side rails 13 mounted along both longitudinal edges thereof. The base 12 aligns and supports a disk spindle 14 to which at least one data storage disk 16 is rotatably mounted. The spindle 14 comprises and includes a three phase in-hub spindle motor 20 (FIGS. 4–5) or a two phase in-hub spindle motor 20' (FIGS. 6–7) exemplifying principles of the present invention. Details of each of the two presently preferred spindle motors are given hereafter.

The disk drive head and disk assembly 10 also includes e.g. a mass balanced rotary voice coil actuator structure 18 mounted to the base 12 which positions at least one data transducer write/read head structure 20 relative to a multiplicity of concentric data tracks defined on the storage surface of the disk 16. The base 12 aligns and secures the spindle assembly 14 and the actuator assembly 18 so that axes of rotation thereof are parallel, and provides sufficient rigidity to these assemblies to obviate off-track conditions during reading and writing operations, when a particular data track is being followed by the head structure 20. A cover, not shown, which may be formed as a stamped sheet metal "dish" structure mounts to the base 12 via a gasket and suitable fasteners (also not shown). The combination of the base 12 and cover enclose and seal a space defined by the base 12, spindle 14, disk 16 and actuator assembly 18, so that the enclosed space may be kept free of dust and other contaminating particles as is conventional in Winchester hard disk technology. A breather filter may permit internal pressure to equalize with external ambient pressure without permitting intrusion of contaminating particulates. An actuator latch structure is also preferably provided to latch the actuator structure at a position aligning the data transducer head structure over an inner landing zone of the disk 16. An aerodynamic actuator latch, such as shown in commonly assigned U.S. patent application Ser. No. 08/005,645 filed on Jan. 19, 1993, and entitled "Aerodynamic Latch with Magnetic Return Spring for Hard Disk Drive", the disclosure being incorporated herein by reference, is preferred for disk diameters 3.5 inches or larger, while a magnetic actuator latch, such as shown in commonly assigned U.S. patent application Ser. No. 07/964,762 filed on Oct. 22, 1992 entitled: "Pivoting Dual State Magnetic Latch for Disk File Actuator", the disclosure being incorporated herein by reference, is preferred for disk diameters 2.5 inches or smaller, for example.

Figure 9:
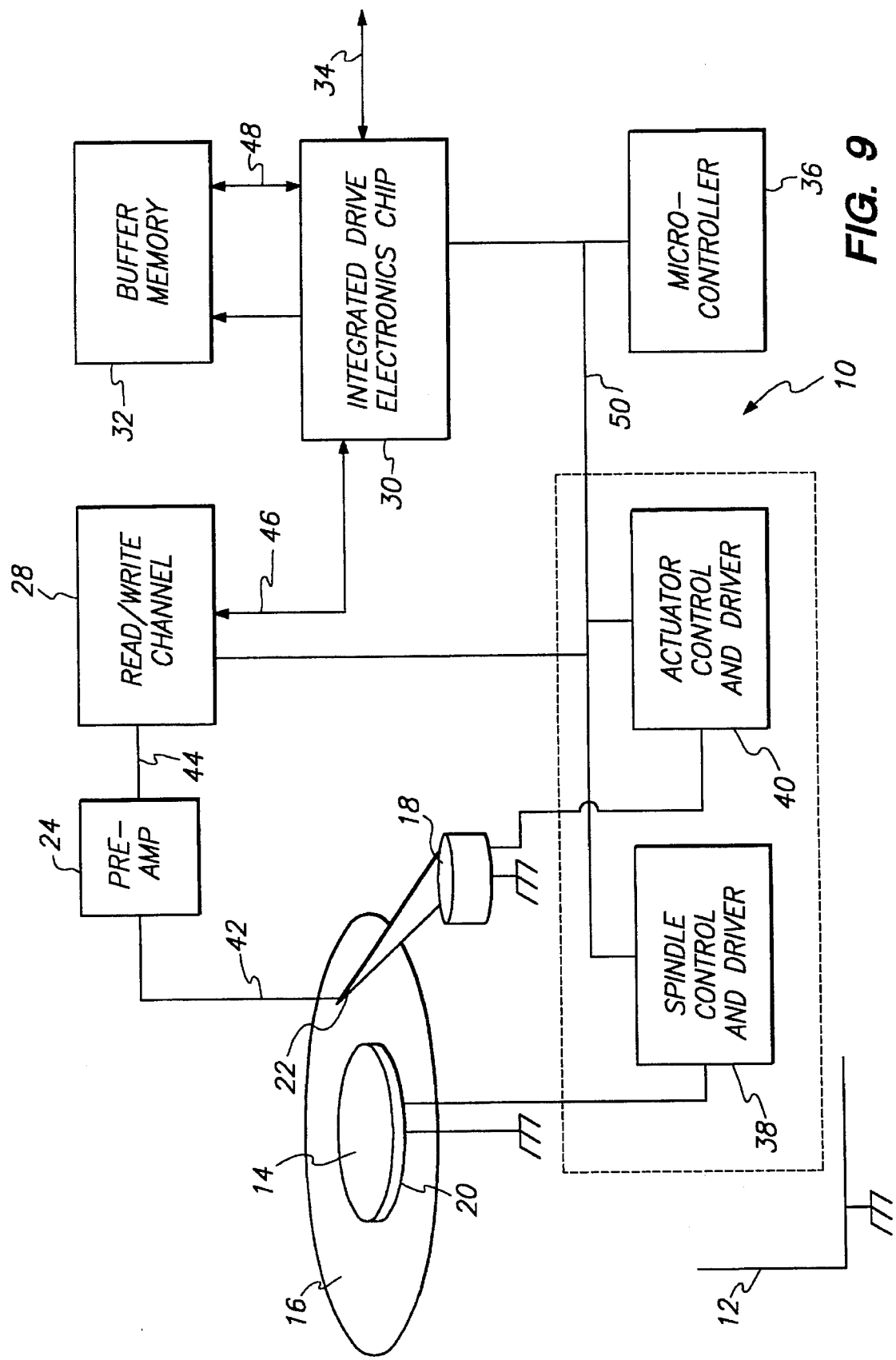
FIG. 9 is a simplified electrical block diagram for controlling the FIG. 1 hard disk drive head and disk assembly.

As shown in FIG. 9, hard disk drive electronics include a preamplifier/write driver circuit 24 which is conventionally located in close proximity to the data transducer head 22 to increase signal to noise ratio. The circuit 24 is most preferably located inside of the space enclosed by the base 12 and its cover, and a suitable connection path, usually a flex-circuit, extends from the preamplifier/write driver circuit 24 to externally mounted electronics 26.

The electronics 26 includes a read/write channel 28 which converts between digital and analog data signals for magnetic recording. The circuit 28 also includes a data synchronizer which generates clocking signals, such as "byte clock", needed to frame coded data words upon reading a serial analog data stream from the disk 16. An integrated drive electronics chip includes an encoder/decoder which encodes and decodes coded data sent to and from the disk into user data values. It also includes a buffer memory controller for controlling addressing of an external buffer memory 32 which stores user data blocks in transit between the disk and an external computing device to which the disk drive assembly 10 is connected. The circuit also includes a bus level interface controller for receiving commands from the host via an interface bus 34 and for sending blocks of data between the buffer memory 32 and the host via the bus 34. The drive electronics chip also includes a data sequencer, address mark decoder, and error correction circuit, and it further includes a servo data decoder which decodes servo data embedded in servo sectors recorded in the data tracks of the data storage disk 16. A master clock circuit, and a motor speed regulation circuit are also formed within the drive chip 30. The chip 30 also includes an interface leading to a programmed microcontroller chip 36 via a bus 50.

The microcontroller chip 36 is multi-tasked. It controls flow of data blocks between the disk and the host in accordance with commands it receives and decodes from the interface in the drive chip 30. It also receives servo information from the servo decoder section of the drive chip 30 and generates head positioning control values which are sent via the bus 50 to an actuator control and driver circuit 40 which in turn generates driving currents and applies them to a coil to position the rotary actuator structure 18 at each selected data storage track location. The microcontroller 36 further controls spinup of the disk spindle motor 20 and disk 16 at power-up, and monitors spindle motor speed during disk drive operations. Control of the spindle motor 20 is carried out via the bus 50 and a spindle motor control and driver circuit 38. In some implementations, the actuator voice coil control and driver circuit 40 and the spindle motor control and driver circuit 38 are formed as a single analog process integrated circuit chip, such as the Texas Instruments TL2204, or equivalent.

The data storage disk 16 is centered and mounted to a rotating hub 70 of the spindle motor 20 by a disk clamp. The data storage disk may have any suitable diameter, although diameters of 95mm (3.5 inch form factor) or 65 mm (2.5 inch form factor) are presently preferred. The disk may be formed of an aluminum alloy substrate, or other suitable substrate such as glass or ceramic, to which a suitable thin film magnetic media is applied to the surfaces thereof e.g. by sputtering. Functional details of the FIG. 9 electronics as well as an exemplary preferred data format are described in commonly assigned U.S. Pat. No. 5,255,136 to Machado et al., entitled: "High Capacity Submicro-Winchester Fixed Disk Drive", the disclosure thereof being incorporated herein by reference. A suitable method and structure for controlling the cost reduced three phase spindle motor of the present invention is described in commonly assigned U.S. patent application Ser. No. 08/094,484 filed on Jul. 19, 1993, entitled: "Brushless DC Spindle Motor Startup Control", the disclosure thereof being incorporated herein by reference.

While only a single transducer 22 is shown diagrammatically in FIG. 1, in practice at least two data transducer heads 22A and 22B are respectively associated with the two major storage surfaces of the disk 16 in a single disk embodiment, such as the embodiment 10. The heads 22A and 22B are formed upon sliders which fly upon an air bearing resulting when the disk 16 is rotated at its intended velocity. The disk 16 is made to be very smooth so that a relatively low flying height of 2.5 to 4 microinches may be maintained between each slider and its respective data storage surface during normal disk drive operations. Each head 22A, 22B may be formed as a thin film deposition upon a ferrite slider, or as a metal-in-gap head, or as a magneto resistive read head, inductive write head composite structure, depending upon desired data densities and performance characteristics.

Referring now to FIGS. 4A, 4B, 4C, 5A and 5B, low cost three phase spindle motor assemblies 20 and 20' include the rotating disk hub 70 which may be suitably formed by machining from aluminum alloy. The hub 70 includes an opening 72 concentric with an axis of rotation 71 of the hub 70 and an outer cylindrical wall 74 sized to match an inner opening of the data storage disk 20. The storage disk rests upon a lower annular flange 75 projecting outwardly from the hub 70. A steel shaft 76 is press-fit into the opening 72 of the disk hub 70 and extends downwardly therefrom. In this example, the steel shaft 76 rotates with the hub, alternatively, it is known to provide a fixed steel shaft which is mounted to the base 12 and in which the bearing assembly is mounted between the fixed shaft and the rotating hub. A flux-return yoke 78 of ferromagnetic material fits against an inside cylindrical wall of the hub 70. A molded permanent magnet 80 is magnetized to have e.g. eight alternating North-South magnetic poles on an inner face (and opposite poles on a corresponding outer face adjacent the flux return yoke 78).

A bearing assembly includes an upper bearing 82 and a lower bearing 84. An inner opening of the bearing assembly fits over the shaft 76, while outer cylindrical walls of the bearings 82, 84 are fit into an annular steel sleeve 98 and glued in place with a suitable adhesive. The sleeve 98 includes an outwardly projecting lower flange 100. The sleeve 98 receives the elements shown in exploded view in FIG. 5 and provides flux return paths between the three pairs of stator disks. The sleeve 98 is fixedly mounted to the base 12, so that the hub 70 and shaft 76 are free to rotate relative to the base 12 about the axis of rotation 71.

Figure 4A:
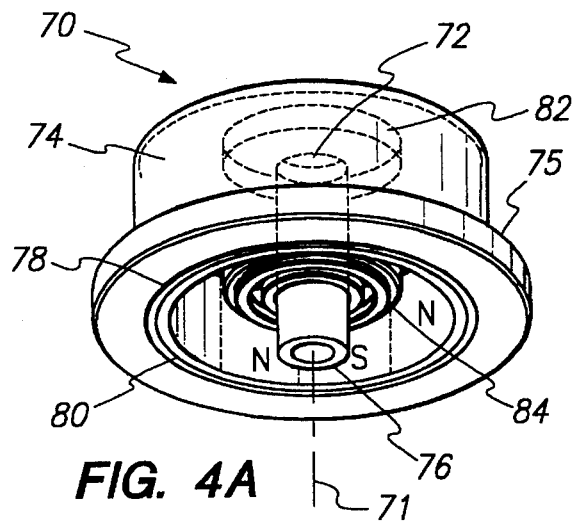
FIG. 4A an enlarged, somewhat diagrammatic isometric view of a rotating disk spindle hub and bearing assembly of the FIG. 1 head and disk assembly.
Figure 4B:
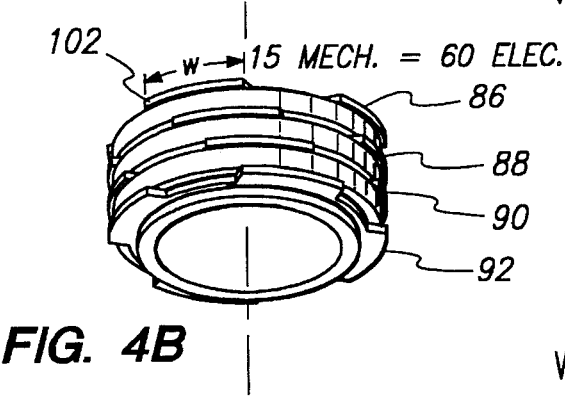
FIG. 4B is an enlarged, somewhat diagrammatic isometric view of one preferred cost reduced fixed three phase stator assembly of the FIG. 1 head and disk assembly, shown in axial alignment with the FIG. 4 rotating disk spindle hub and bearing assembly.

In FIG. 4B, four stator disks 86, 88, 90 and 92 are die-stamped from a suitable ferromagnetic material, such as a single sheet of silicon iron, or are formed as laminations of stampings from ferromagnetic material. The stator disks 86 and 88 form an upper stator pair (phase U), stator disks 88 and 90 form a middle stator pair (phase V) and stator disks 90 and 92 form a lower stator pair (phase W). Each stator disk is identical with the other and defines a plurality of radially extending pole portions. In this embodiment with an eight pole magnet 80, four pole ends 102 are formed. Each pole end 102 has a circumferential arc length (denoted by the reference character w in FIG. 4B) selected to minimize cogging torque and to maximize excitation torque. Each stator disk 86, 88, 90 and 92 is circumferentially displaced its adjacent disk or disks by 15 degrees of rotation (mechanical, which equates to 60 degrees of electrical rotation) Three preformed coils 94, 96 and 97 are placed between the four stator disks 86, 88, 90 and 92 as shown in FIG. 4B.

Figure 4C:
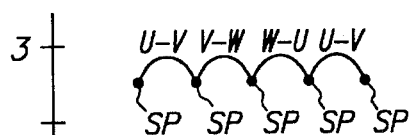
FIG. 4C is a graph of unit torque and unit torque sums as a function of time for the FIG. 4B stator arrangement in combination with the FIG. 4A rotating hub.
Figure 4C:
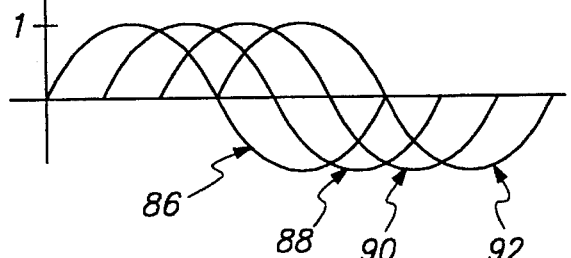

When current is selectively passed through progressively selected pairs of series-connected coil phases U, V and W, the stator pole ends develop electromagnetic fields which co-act with the magnetic fields of the permanent magnet 80 such that desired unidirectional rotational force is imparted to the magnet 80 and in turn to the flux return plate 78 and disk hub 70. This resultant torque is graphed in FIG. 4C which shows the torque contribution of each one of the stator disks 86, 88, 90 and 92 as a function of time. In order to achieve the desired unidirectional torque, the current through the progressively selected coil pairs is switched at switch points SP as shown at the top of FIG. 4c. The switch points in this example are spaced at 60 degrees (electrical). When coils 94 and 96 (U–V) are driven in series the torque sum is from stator disks 86+88+88+90 for a maximum peak unit torque value of 3. Similarly, when coils 96 and 97 (V–W) are driven in series) the torque sum is from stator disks 88+90+90+92 for a maximum torque value of 3. When coils 97 and 94 (W–U) are driven in series, the torque sum is from stator disks 90+92+86+ 88, also for a maximum torque value of 3.

Figure 5A:
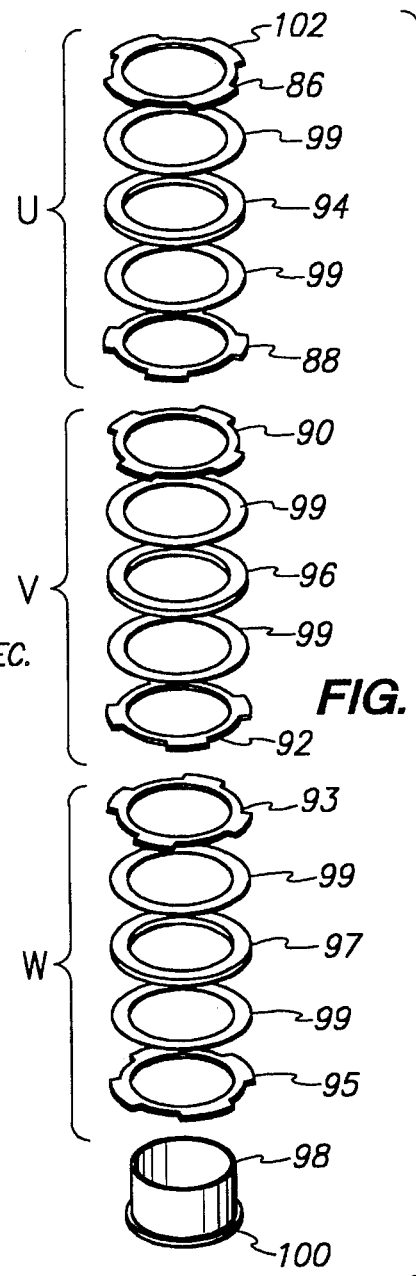
FIG. 5A is an exploded isometric view of a second preferred fixed three phase stator assembly for use with the FIG. 4A rotating hub.
Figure 5B:
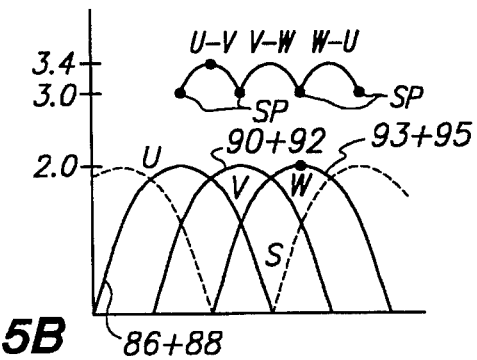
FIG. 5B is a graph of unit torque and unit torque sums as a function of time for the FIG. 5A stator arrangement in combination with the FIG. 4A hub.

An arrangement providing slightly improved torque output is shown in FIGS. 5A and 5B. In FIG. 5A, six stator disks 86, 88, 90, 92, 93 and 95 are die-stamped from a suitable ferromagnetic material, such as single sheet or insulated laminar sheets of silicon iron sheet metal. Stator disks 86 and 88 form an upper stator pair (phase U), stator disks 90 and 92 form a middle stator pair (phase V), and stator disks 93 and 95 form a lower stator pair (phase W). It is important to note that each stator disk is identical with the other, and includes e.g. four radially extending pole ends 102. Each pole end 102 has a circumferential arc length (denoted by reference character w in FIG. 4B) configured to control cogging torque in order to smooth out the torque ripple of the spindle motor and also to maximize excitation torque. The pole ends 102 of each stator disk 86–95 are centered at zero, 90, 180 and 270 degrees about the circumference of each stator plate.

The stator disk 86 of the upper pair is arranged to have a zero degrees (or 90 degrees) orientation with a uniform angular reference line 106 normal to an longitudinal explosion axis of the motor 20 as shown in FIG. 2. Stator disk 88 is arranged to have a rotational offset of 45 degrees relative to the stator disk 86. In the middle pair, stator disk 92 is likewise offset by 45 degrees from stator disk 90, and disk 90 is offset by 60 electrical degrees from stator disk 86. Stator disk 92 is offset by 45 degrees from disk 90. In the bottom pair, stator disk 93 is offset by 120 electrical degrees from disk 86, and disk 95 is offset by 45 degrees from disk 93. Three preformed coils 94, 96 and 97 are sandwiched respectively between the upper stator disk pair 86 and 88, the middle stator disk pair 90 and 92 and the lower stator disk pair 93 and 95. In this example insulating disks 99 separate each conductive stator disk and its adjacent coil. Each coil comprises e.g. about 120 turns of 36 gauge insulated copper wire and is suitably connected via a connector to the motor drivers circuit 38.

As shown in FIG. 5B, when current is selectively passed through selective pairs of series-connected coil phases U, V and W, the stator pole pairs 86+88 (phase U) 90+92 (phase V) and 93+95 (phase W) develop electromagnetic fields which co-act with the magnetic fields of the permanent magnet 80 such that desired unidirectional rotational force is imparted to the magnet 80 and in turn to the flux return plate 78 and disk hub 70. Since each phase has its own optimally aligned pair of stator disks, slightly greater peak unit torque (3.4) results when driving currents are switched at the switch points SP shown in FIG. 5B.

Figure 8:
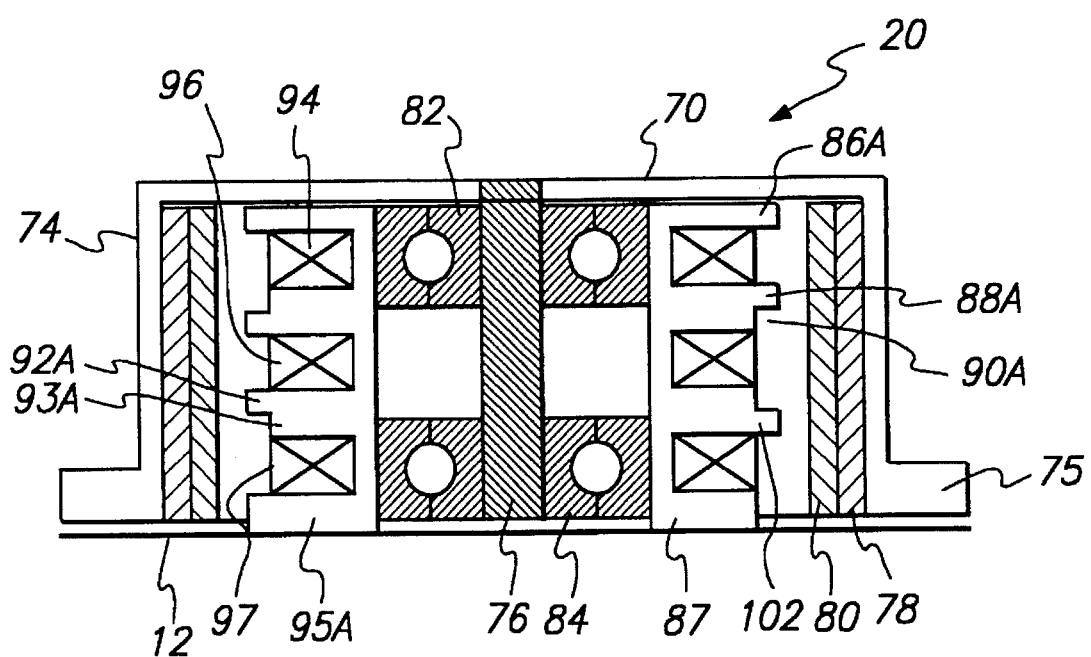
FIG. 8 is a diagrammatic view in cross section of an alternative embodiment of the present invention in which a single stator assembly formed e.g. by injection molding holds a plurality of coils and defines plural motor phases with respect to a rotating disk hub illustrated in FIG. 4A.

FIG. 8 illustrates an embodiment which is very similar to the one illustrated in FIG. 5A, except that in the FIG. 8 embodiment, the motor 20' includes a unitary stator structure 87. The unitary stator structure 87 may be formed by any suitable method, preferably injection molding of a suitable ferromagnetic material. One known and presently preferred method makes use of plastic injection molding techniques. A precision injection mold is formed. Ferromagnetic material, such as silicon-iron powder, is combined with a suitable flowable-state plastic resin binder. This mixture is injected into the mold and then cured to a solid state. The mold is then opened and a precision molded part, such as the unitary stator structure 87 is removed. As molded, the element 87 defines a series of circumferentially offset pole ends 102 with the same angular configuration shown in the FIG. 5A embodiment, for example. Accordingly, stator disk portions 86A, 88A, 90A, 92A, 93A and 95A each have e.g. four pole ends 102 which correspond in magnetic pole alignment with the separate stator disks 86-95 and their respective pole ends 102, shown in FIG. 5A.

During normal operation, the hub 70 rotates in a predetermined direction at a nominal operating frequency, such as approximately 3600 RPM. Three phase commutation of the spindle motors 20 and 20' is carried out in accordance with any one of a number of sensor-less commutation techniques, such as the one mentioned above as described in commonly assigned, copending U.S. patent application Ser. No. 08/094,484.

Figure 6:
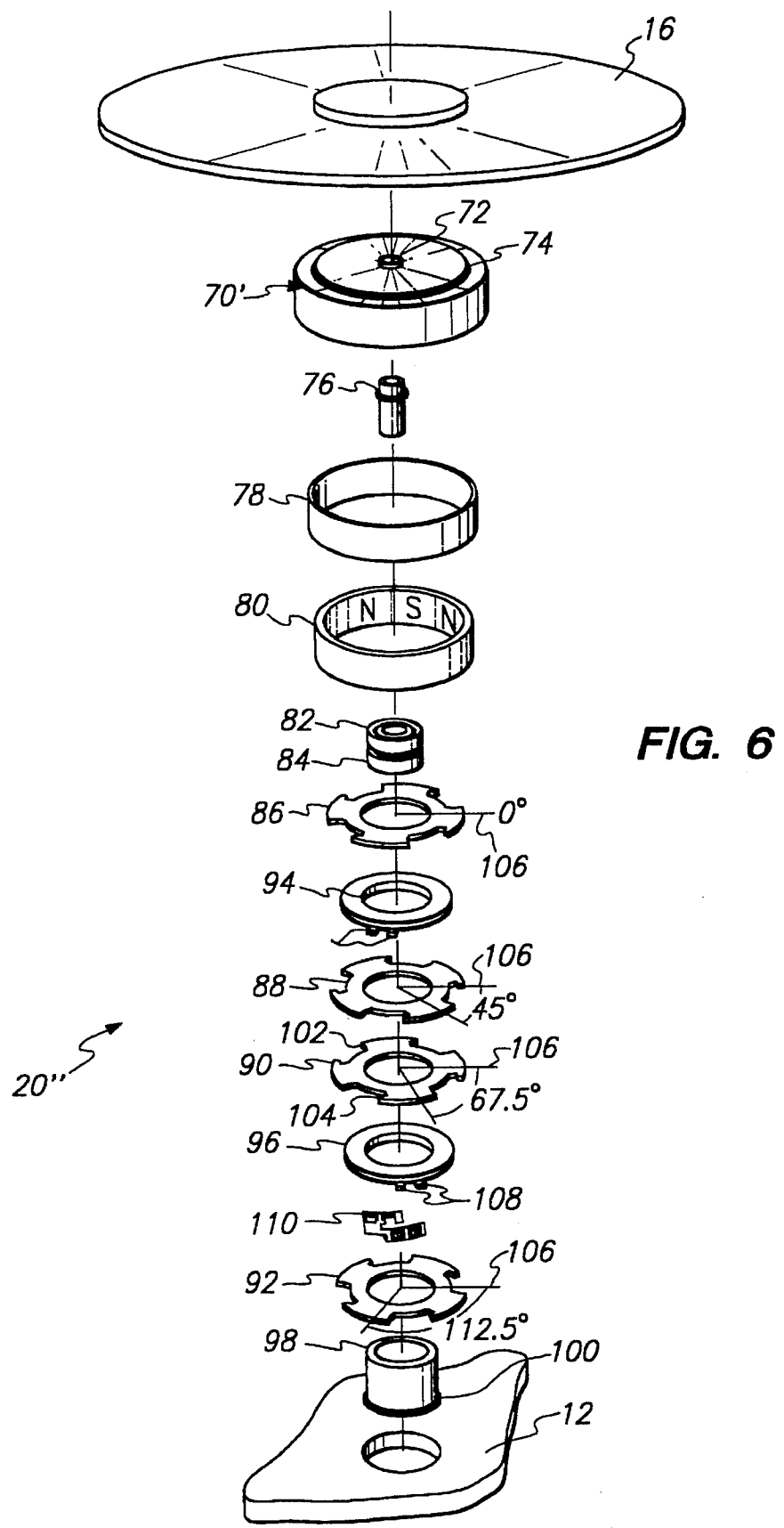
FIG. 6 is an exploded isometric view of a cost reduced eight pole, four phase dual bobbin disk spindle motor for rotating a data storage disk of the FIG. 1 head and disk assembly.

A two phase spindle motor 20" is shown in the exploded view of FIG. 6. In this view, functionally identical elements bear the same reference numerals already assigned to elements in FIGS. 1–5. The hub 70' differs slightly from the hub 70 of FIG. 4A, in that the hub 70" has a greater diameter and is located substantially below the storage disk 16. The annular wall 74 is reduced to be coequal with the thickness of the disk 16. In this arrangement the spindle motor may achieve greater torque by having a greater diameter.

In the FIG. 6 motor embodiment 20", four stator pole disks 86, 88, 90 and 92 are provided instead of six as with the previously described embodiment. Disks 86 and 88 form an upper stator pair, while pole disks 90 and 92 form a lower stator pair. It is important to note that each pole disk is identical with the other, and includes four pole ends. Each pole end includes e.g., a straight side 102 and a notched or undercut side 104. The notched or undercut side 104 of each pole end is configured to add a controlled amount of cogging torque in order to smooth out the torque ripple of the motor. The pole ends are disposed at zero, 90, 180 and 270 degrees about the circumference of each stator plate.

The stator disk 86 of the upper pair of the FIG. 6 embodiment is arranged to have a zero degrees (or 90 degrees) orientation with a uniform angular reference line 106 normal to an longitudinal explosion axis of the motor 20 as shown in FIG. 6. Stator disk 88 is arranged to have a rotational offset of 45 degrees relative to the stator disk 86 of the upper pair. Stator disk 92 is likewise offset by 45 degrees from stator plate 90, and plate 90 is offset by 67.5 degrees from stator disk 86. The lowest stator disk 92 is offset by 112.5 degrees from the reference line 106. Two wire bobbins including coils 94 and 96 are sandwiched respectively between the upper stator plate pair 86 and 88, and the lower stator plate pair 90 and 92. Each bobbin is formed of a suitable insulating plastic material, and may include two peripheral terminals 108 for providing electrical connections to the wire ends of each coil 94 or 96. A flex circuit 110 is provided to connect to each bobbin terminal pair 108 and to a motor terminal block the printed circuit card carrying the spindle control and driver chip 38. In the second embodiment, the driving circuit 38 follows any suitable two-phase bi-directional H-Bridge driver design, rather than the three-phase driver design used with the first embodiment.

Figure 7:
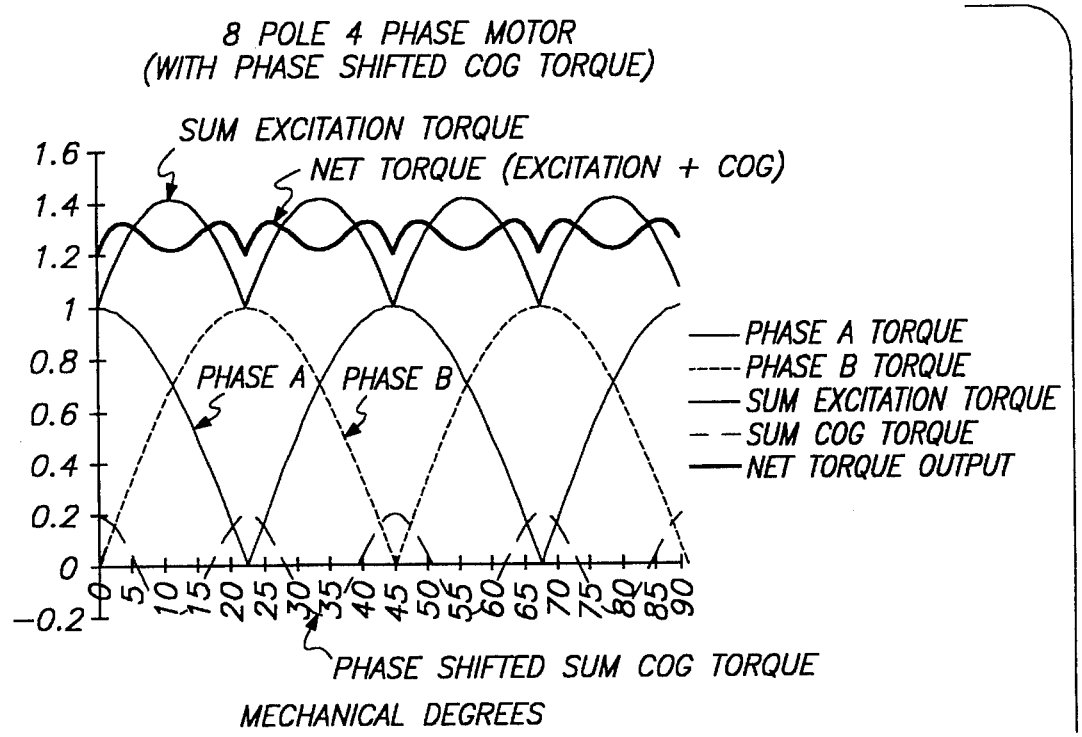
FIG. 7 is a graph comprising a series of plots of torque versus angular displacement of the rotor of the FIG. 6 eight pole, four phase disk spindle motor, illustrative of functional characteristics thereof.
Figure 7:
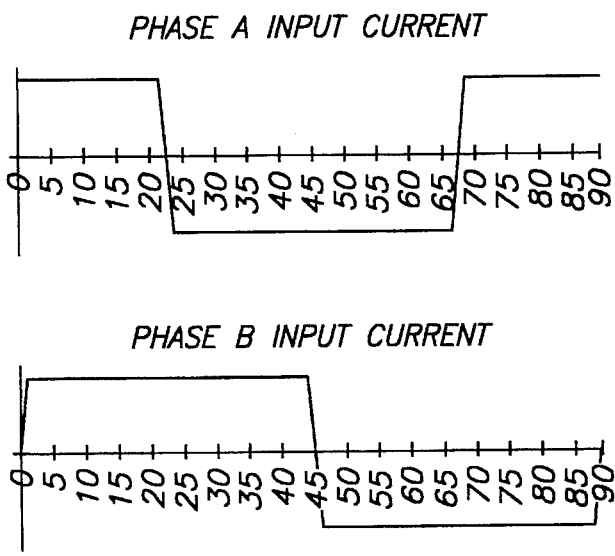

Turning now to FIG. 7, further electromechanical aspects of the two-phase motor 20' are revealed. Essentially, two bobbin stators (motors) are formed in combination with the single rotating magnet 80 within the motor assembly 20: a first or upper motor comprising stator plates 86 and 88, and bobbin coil 94; and, a second or lower motor comprising stator plates 90 and 92 and bobbin coil 96. Electrical signals are applied to both coils 94 and 96 in proper phase and polarity during constant speed operation. Phase A in FIG. 7 depicts the torque developed in the first, upper motor in response to the phase A input current, and phase B depicts the torque developed in the second, lower motor in response to the phase B input current. The graph labeled "phase shifted sum cog torque" depicts the alteration of torque produced by shaping of the pole ends of the stator plates at edges 104. The graph labeled "sum excitation torque" represents a summation of the two excitation torques labeled "phase A" and "phase B". The graph labeled "net torque (excitation+cog)" depicts the resultant sum of all torque forces developed within the motor 20' and applied to rotate the data storage disk 16, and represents qualitatively the resultant torque ripple.

Having thus described two embodiments of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A low cost, polyphase spindle motor for a disk drive comprising:

a base, a cup-shaped rotating hub for mounting at least one rotating data storage disk, bearing means mounted between the base and the hub for enabling rotation of the hub relative to the base, a cylindrical permanent magnet mounted to an inside cylindrical wall of the hub and defining eight circumferentially alternating magnetic pole faces, a stator structure mounted to the base and defining a cylindrical ferromagnetic sleeve portion extending from the base and forming one element of the bearing assembly, the sleeve portion defining a pair of stacked, generally U-shaped stator armature portions fixed with respect to the base, each stator armature portion comprising a top stator disk portion of ferromagnetic material, a bottom stator disk portion of ferromagnetic material and wherein the ferromagnetic sleeve portion of the stator structure portion magnetically couples the top stator disk portion and the bottom stator disk portion of each stator armature portion, the stator armature portion further including a coil of conductive wire between the top stator portion and the bottom stator portion, each stator portion defining a plurality of circumferentially spaced apart stator pole ends being in number related to the number of poles of the permanent magnet, the pole ends of the bottom stator portion being angularly displaced from the pole ends of the top stator portion by a first electrical angle of 45 degrees, the pole ends of the stator portions of each of the plurality of stator armature portions being electrically angularly displaced from the pole ends of at least one of the stator portions of the other of the plurality of stator armature portions by a second electrical angle of 22.5 degrees.

2. The spindle motor for a disk drive set forth in claim 1 wherein each pole end of each stator portion is contoured in order to reduce cogging torque of the spindle motor.

3. The spindle motor for a disk drive set forth in claim 1 wherein each pole end of each stator portion is provided with a circumferential arc length to minimize cogging torque and to maximize excitation torque.

4. The spindle motor for a disk drive set forth in claim 1 wherein each stator portion including pole ends thereof is formed as a unitary structure of ferromagnetic material.

5. The spindle motor for a disk drive set forth in claim 1 wherein the sleeve portion comprises a single sleeve, and wherein each stator disk portion of each stator armature portion comprises a discrete disk structure secured to the single sleeve.

6. The spindle motor for a disk drive set forth in claim 1 further comprising a rotating shaft fixed to the hub, the bearing means being between the shaft and the ferromagnetic sleeve.

7. The spindle motor for a disk drive set forth in claim 1 wherein the hub is comprised of a non-ferromagnetic material, and further comprising a flux return ring of ferromagnetic material interposed between the inside wall of the hub and the cylindrical permanent magnet.

8. The spindle motor for a disk drive set forth in claim 1 wherein the hub has an outer cylindrical wall having a diameter greater than a diameter of a central annular opening of the data storage disk and includes an inset raised annular shoulder of a top wall sized to align with the central annular opening of the data storage disk, and further comprising a disk clamp for mounting the disk to the hub at the raised annular shoulder.

9. The spindle motor for a disk drive set forth in claim 1 wherein each coil of conductive wire is preformed prior to assembly into a corresponding stator armature portion.

10. A low cost, polyphase spindle motor for a disk drive comprising:

a base, a cup-shaped rotating hub for receiving and rotating at least one data storage disk, bearing means mounted between the base and the hub for enabling rotation of the hub relative to the base, a cylindrical permanent magnet mounted to an inside cylindrical wall of the hub and defining eight circumferentially alternating magnetic pole faces, a stator structure mounted to the base and defining a cylindrical ferromagnetic sleeve portion extending from the base and forming one element of the bearing assembly, the sleeve portion defining three stacked, generally U-shaped stator armature portions fixed with respect to the base, each stator armature portion comprising a top stator disk portion of ferromagnetic material, a bottom stator disk portion of ferromagnetic material and wherein the ferromagnetic sleeve portion of the stator structure portion magnetically couples the top stator disk portion and the bottom stator disk portion of each stator armature portion, each stator armature portion further including a coil of conductive wire between the top stator portion and the bottom stator portion, each stator portion defining a plurality of circumferentially spaced apart stator pole ends being in number related to the number of poles of the permanent magnet, the pole ends of the bottom stator portion being angularly displaced from the pole ends of the top stator portion by a first electrical angle of 45 degrees, and the pole ends of the stator portions of each of the plurality of stator armature portions being electrically angularly displaced from the pole ends of at least one of the stator portions of the other of the plurality of stator armature portions by a second electrical angle of 60 degrees.

11. The spindle motor set forth in claim 10 wherein each pole end of each stator portion is contoured in order to reduce cogging torque of the spindle motor.

12. The spindle motor set forth in claim 10 wherein each pole end of each stator portion is provided with a circumferential arc length to minimize cogging torque and to maximize excitation torque.

13. The spindle motor set forth in claim 10 wherein each stator portion including pole ends thereof is formed as a unitary structure of ferromagnetic material.

14. The spindle motor set forth in claim 10 wherein the sleeve portion comprises a single sleeve, and wherein each stator disk portion of each stator armature portion comprises a discrete disk structure secured to the single sleeve.

15. The spindle motor set forth in claim 10 wherein each coil of conductive wire is preformed prior to assembly into a corresponding stator armature portion.

16. The spindle motor set forth in claim 10 further comprising a rotating shaft fixed to the hub, the bearing means being between the shaft and the ferromagnetic sleeve.

17. The spindle motor set forth in claim 10 wherein the hub is comprised of a non-ferromagnetic material, and further comprising a flux return ring of ferromagnetic material interposed between the inside wall of the hub and the cylindrical permanent magnet.

18. The spindle motor set forth in claim 10 wherein the hub has an outer cylindrical wall having a diameter greater than a diameter of a central annular opening of the data storage disk and includes an inset raised annular shoulder of a top wall sized to align with the central annular opening of the data storage disk, and further comprising a disk clamp for mounting the disk to the hub at the raised annular shoulder.

19. A low cost, polyphase spindle motor for a disk drive comprising:

a base, a cup-shaped rotating hub for receiving and rotating at least one data storage disk, bearing means mounted between the base and the hub for enabling rotation of the hub relative to the base, a cylindrical permanent magnet mounted to an inside cylindrical wall of the hub and defining eight circumferentially alternating magnetic pole faces, a stator structure mounted to the base and defining a cylindrical ferromagnetic sleeve portion extending from the base and forming one element of the bearing assembly, the sleeve portion defining three stacked, generally U-shaped stator armature portions and four stator disk portions of ferromagnetic material, each stator armature portion including a top stator disk portion, a coil of conductive wire, and a bottom stator disk portion and wherein the ferromagnetic sleeve portion of the stator structure portion magnetically couples the top and bottom stator disk portions, and at least two of the stator disk portions operating magnetically in common with adjacent stator armature portions.

20. The spindle motor set forth in claim 19 wherein each pole end of each stator portion is contoured in order to reduce cogging torque of the spindle motor.

21. The spindle motor set forth in claim 19 wherein each pole end of each stator portion is provided with a circumferential arc length to minimize cogging torque and to maximize excitation torque.

22. The spindle motor set forth in claim 19 wherein each stator portion including pole ends thereof is formed is formed as a unitary structure of ferromagnetic material.

23. The spindle motor set forth in claim 19 wherein the sleeve portion comprises a single sleeve, and wherein each stator disk portion of each stator armature portion comprises a discrete disk structure secured to the single sleeve.

24. The spindle motor set forth in claim 19 wherein each coil of conductive wire is preformed prior to assembly into a corresponding stator armature portion.

25. The spindle motor set forth in claim 19 further comprising a rotating shaft fixed to the hub, the bearing means being between the shaft and the ferromagnetic sleeve.

26. The spindle motor set forth in claim 19 wherein the hub is comprised of a non-ferromagnetic material, and further comprising a flux return ring of ferromagnetic material interposed between the inside wall of the hub and the cylindrical permanent magnet.

27. The spindle motor set forth in claim 19 wherein the hub has an outer cylindrical wall having a diameter greater than a diameter of a central annular opening of the data storage disk and includes an inset raised annular shoulder of a top wall sized to align with the central annular opening of the data storage disk, and further comprising a disk clamp for mounting the disk to the hub at the raised annular shoulder.

* * * * *